B. C. HOEFER.
COIN DELIVERING MACHINE.
APPLICATION FILED MAR. 25, 1912.

1,105,517.

Patented July 28, 1914.
7 SHEETS—SHEET 2.

Witnesses:
Robert F. Baacke
Albert G. McCaleb

Inventor
Benjamin C. Hoefer
By Brown & Williams
Attorneys

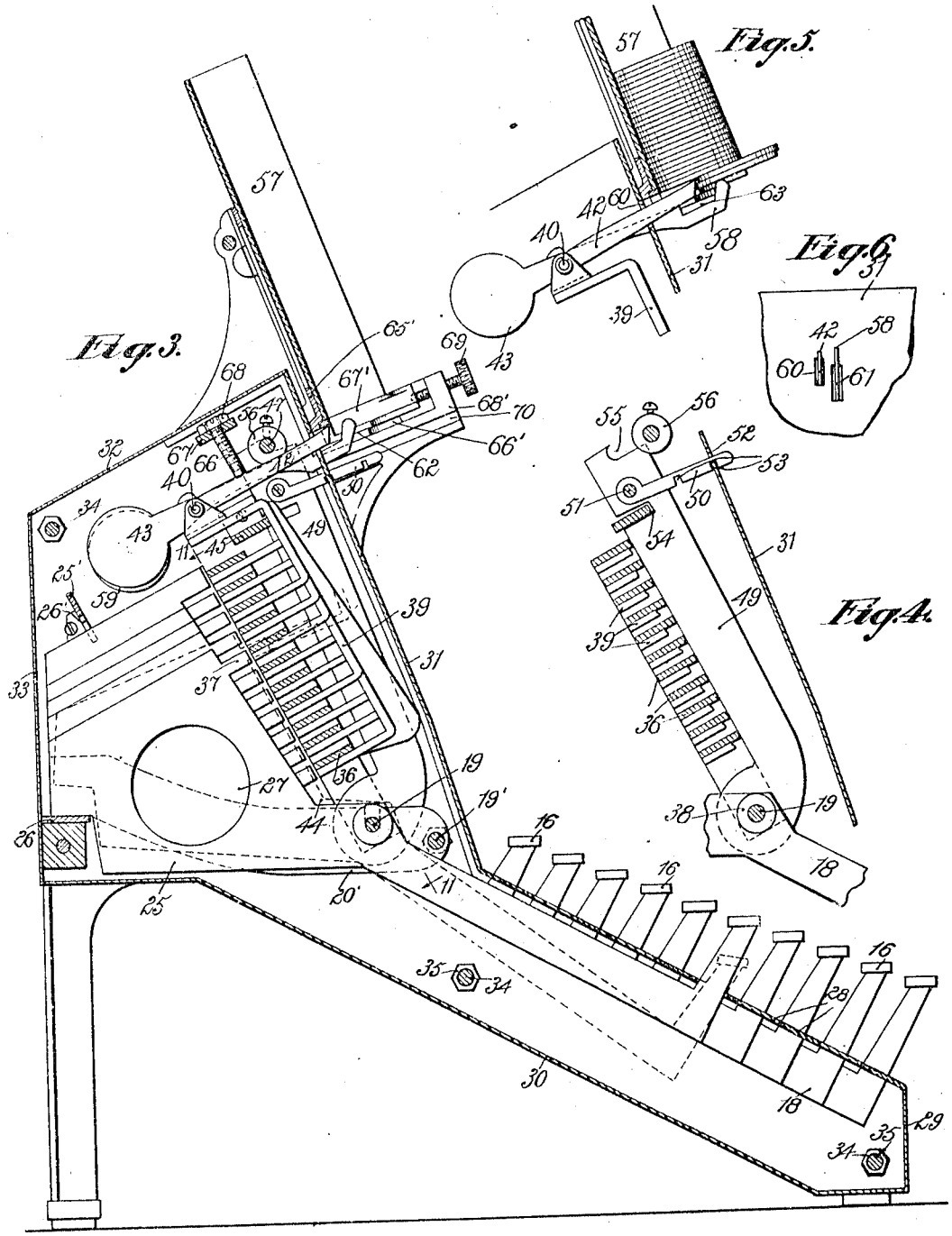

B. C. HOEFER.
COIN DELIVERING MACHINE.
APPLICATION FILED MAR. 25, 1912.
1,105,517.
Patented July 28, 1914.
7 SHEETS—SHEET 4.
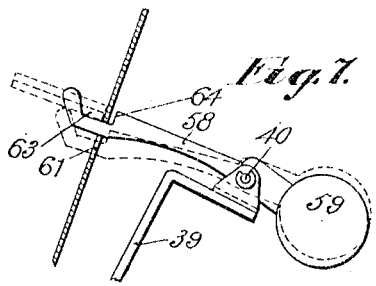
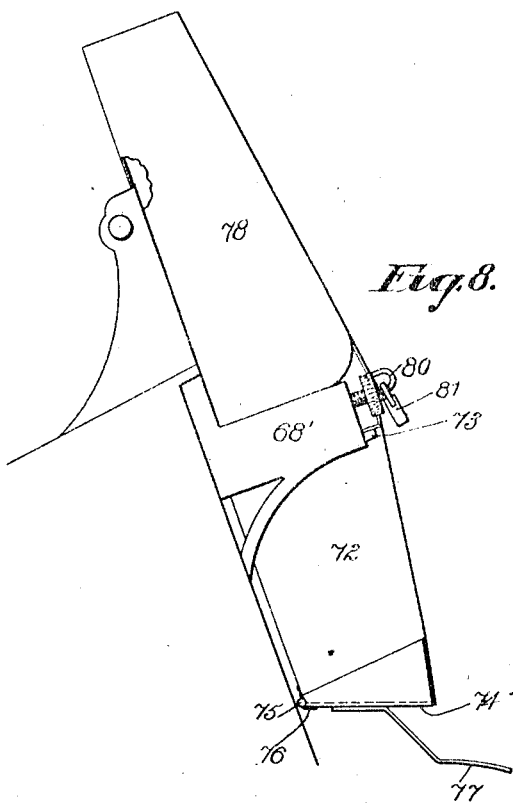
Witnesses:
Robert F. Bracke
Albert G. McCabe
Inventor
Benjamin C. Hoefer
By Brown & Williams
Attorneys B. C. HOEFER.
COIN DELIVERING MACHINE.
APPLICATION FILED MAR. 25, 1912.
1,105,517.
Patented July 28, 1914.
7 SHEETS—SHEET 5.
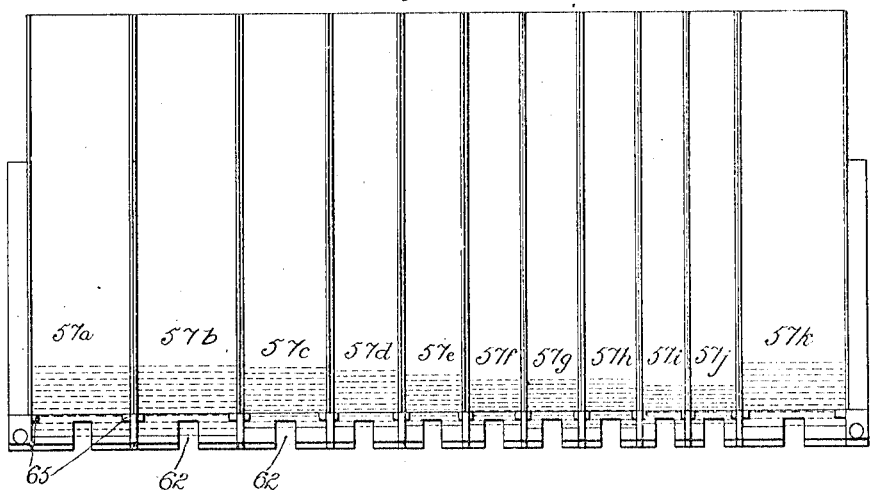
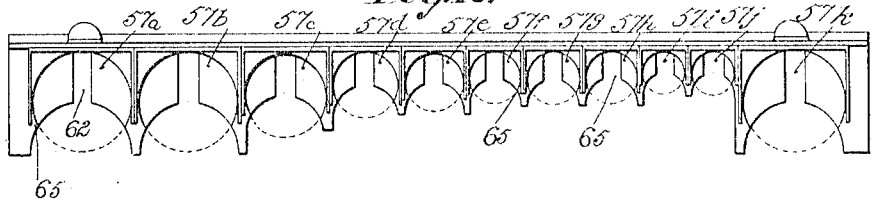

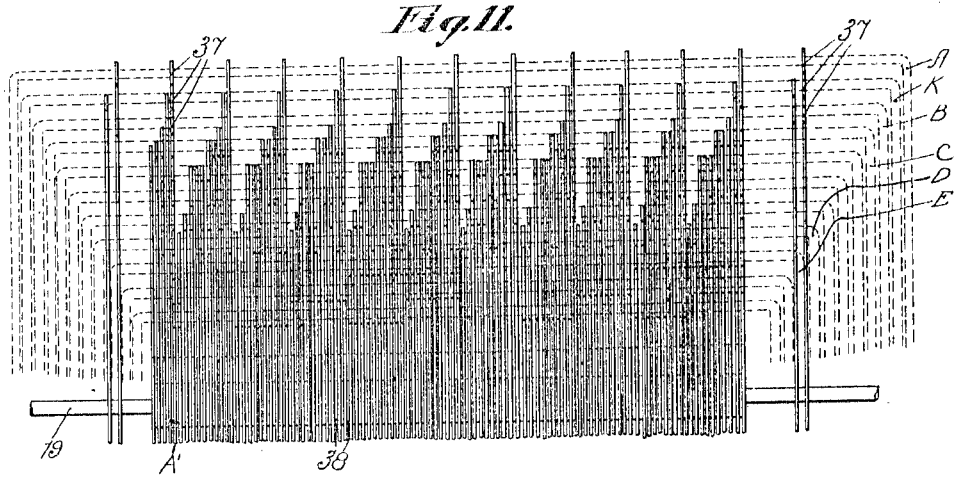
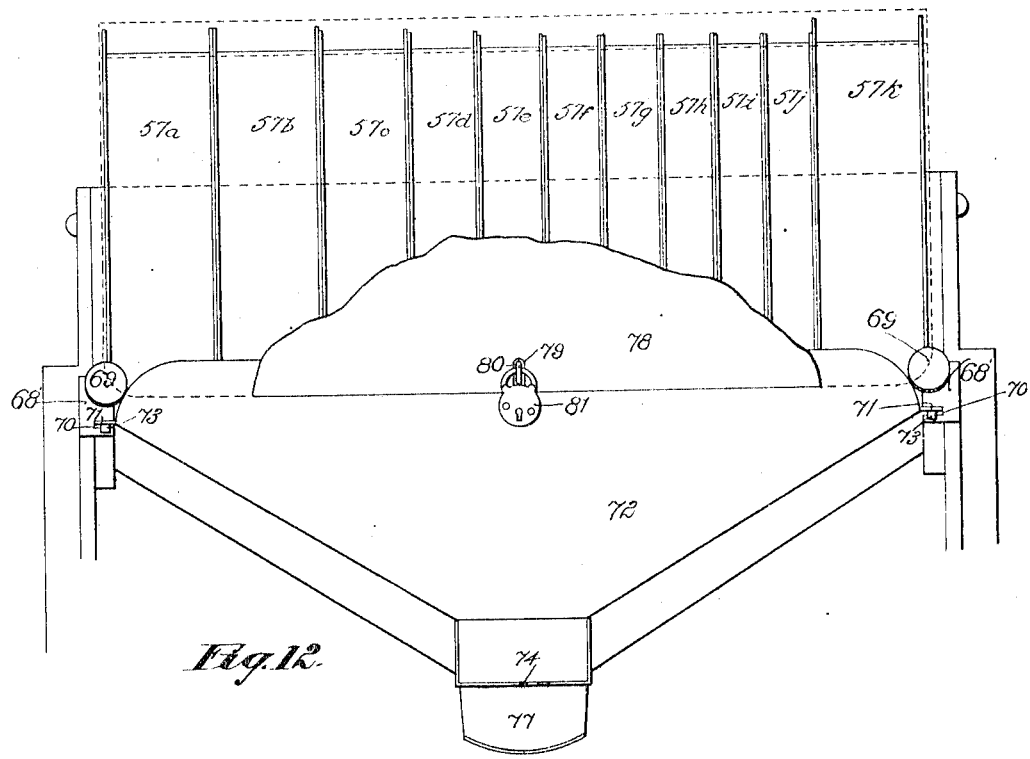

B. C. HOEFER.
COIN DELIVERING MACHINE.
APPLICATION FILED MAR. 25, 1912.

1,105,517.

Patented July 28, 1914.
7 SHEETS—SHEET 7.

Witnesses:
Robert F. Brache
Albert J. McCabb

Inventor
Benjamin C. Hoefer
By Brown & Williams
Attorneys

UNITED STATES PATENT OFFICE.

BENJAMIN C. HOEFER, OF CHICAGO, ILLINOIS.

COIN-DELIVERING MACHINE.

1,105,517.  Specification of Letters Patent.  Patented July 28, 1914.

Application filed March 25, 1912. Serial No. 686,062.

*To all whom it may concern:*

Be it known that I, BENJAMIN C. HOEFER, a citizen of the United States, residing at Chicago, in the county of Cook and State of Illinois, have invented a certain new and useful Improvement in Coin-Delivering Machines, of which the following is a full, clear, concise, and exact description, reference being had to the accompanying drawings, forming a part of this specification.

My invention relates to coin delivering machines and has for its object a more simplified construction and efficient operation than has characterized devices of this class in the prior art.

My invention contemplates a construction wherein the number of parts is reduced to a minimum and these parts are built in such a way that repair of the same is seldom, if ever, necessary. It might be stated that all that is necessary in connection with my machine is the initial adjustment which will obviate any later adjustment in connection with the operation of the machine.

My invention is an improvement over the construction shown and described in my copending application No. 629,593 and filed May 26, 1911.

My invention will be clearly understood, reference being had to the accompanying drawings in which—

Figure 1:
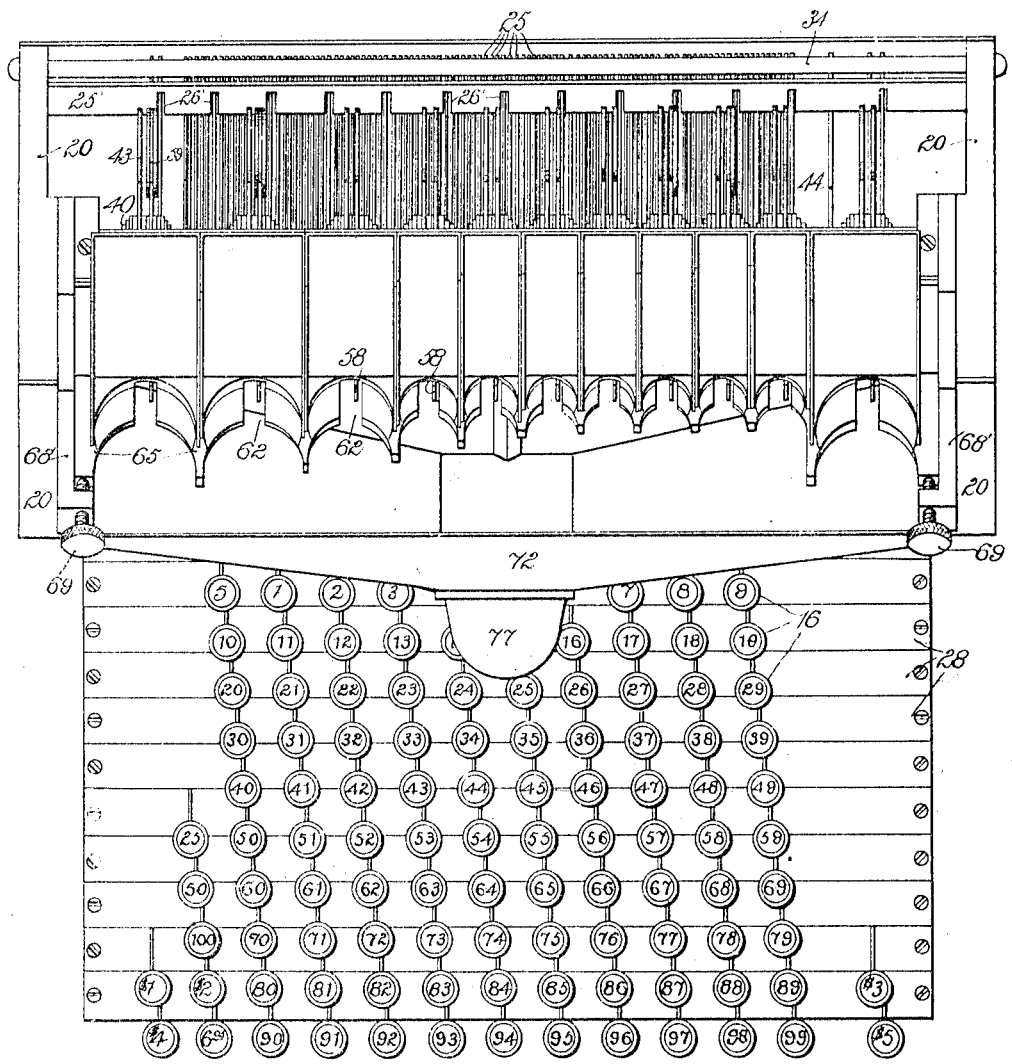
Figure 2:
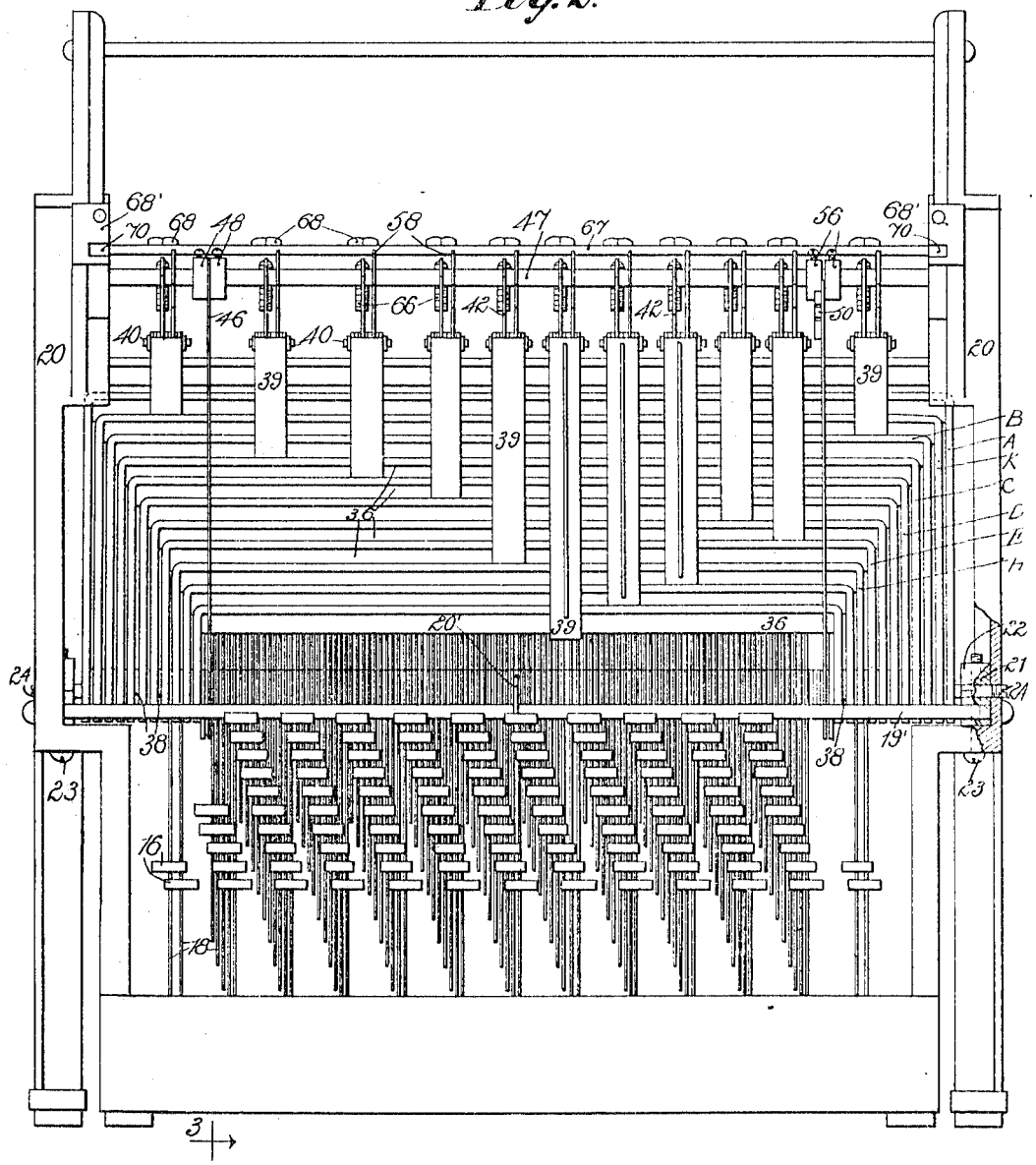
Figure 13:
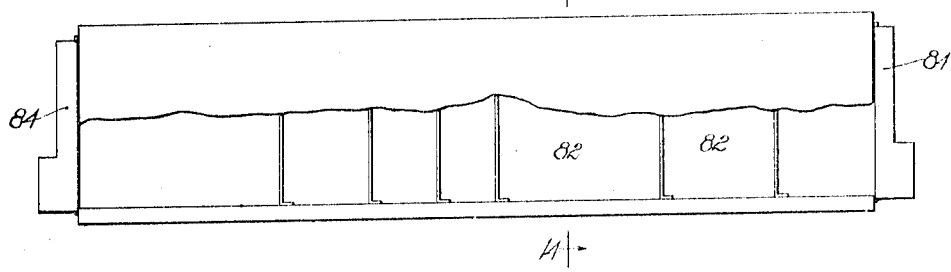
Figure 14:
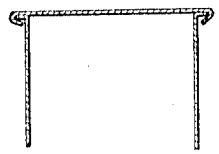
Figure 15:
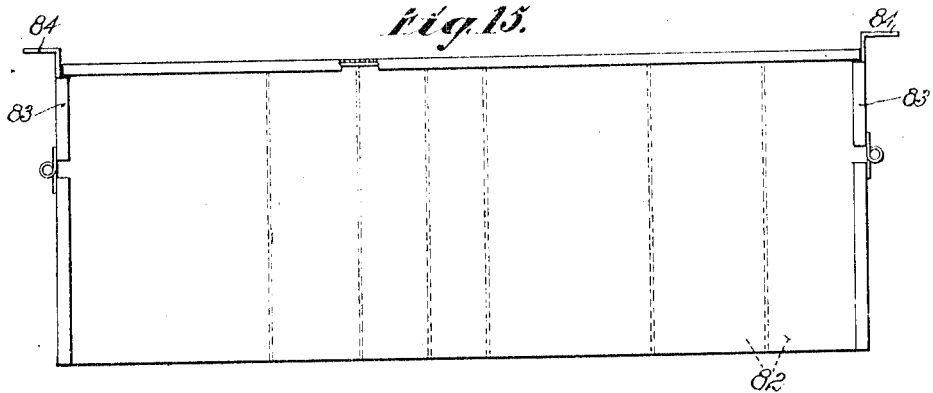

Figure 1 is a top view of the machine. Fig. 2 is a front elevation of the parts shown in Fig. 1, except the money magazine which is removed. Fig. 3 is a sectional view taken on line 3—3 of Fig. 2. Fig. 4 is a detail view of locking mechanism for the U-bars used in connection with my machine. Fig. 5 is a detail view showing the bars of the money magazine with coins therein and the ejector mechanism expelling two of the coins from the magazine. Fig. 6 is a detail view showing the slots in the plate through which the ejector mechanisms extend. Fig. 7 is a view somewhat similar to Fig. 5 looking at the ejector mechanism from the opposite side from that shown in Fig. 5. Fig. 8 shows principally the hopper used in connection with my machine and the hood covering the money magazine and locked to the hopper. Fig. 9 is an elevation of the money magazine, and Fig. 10 is a top view thereof. Fig. 11 is a view illustrating the code arrangement taken on line 11—11 of Fig. 3. Fig. 12 is a front view of the parts shown in Fig. 8. Fig. 13 is a top view of a coin receptacle which may replace the hopper in certain cases. Fig. 14 is a section view taken on line 14—14 of Fig. 13. Fig. 15 is an elevation view of the coin receptacle.

Referring particularly to Fig. 3, there is shown a plurality of keys 16 which are arranged in rows extending in two directions as shown in Fig. 1. Each of these keys is a part of a key bar 18 which is pivoted on a rod 19 extending between the sides 20—20 of the machine. A rod 19' which is fastened in the side members of the machine has secured to it a member 20' which rests in the rear upon the member 26 and is used for reinforcing the rod 19 so as to sustain the weight upon this rod. At each side the rod bears in a journal 21 which has a top member 22 adapted to be bolted to the lower portion by means of screws 23. In each side piece a screw 24 abuts against the rod 19 and serves the purpose of giving this rod a lateral adjustment as the case may require. Each of the key bars 18 has extending therefrom an enlarged portion 25 which is adapted to rest upon a member 26 extending between the sides of the machine. The purpose of this weighted portion is to retain the keys in their normal position and also to restore the keys to their normal position after they have been depressed. It may be stated that these enlarged portions are enlarged in accordance with the length of the key bar of which it forms a part. An alining member 25' is suitably secured and serves to keep the highest enlarged portions in an erect position owing to the engagement of such portions in slots 26' disposed along the length of this member. This member 25' thus keeps the enlarged portion from leaning to one side and thus prevents a great deal of friction when the others are moved or actuated. In certain cases, such as with the smaller key bars, openings 27 are stamped in the enlarged portions so that the arrangement as a whole provides that about the same amount of power is required to operate each of the keys 16. The key bars extend through openings in the plate 28 which is suitably secured to the side pieces 20—29. Other plates 29 and 30 at the front and bottom of the machine serve to inclose the key bars as will be seen from Fig. 3. Additional plates 31 in the front of the machine and 32 at the top and 33 at the rear serve to inclose the greater portion of the mechanism of the machine. Extending between the two sides and in order to form a rigid construction I have employed rods 34 disposed at suitable portions of the machine and which are held in position on the inside of the machine by means of nuts 35—35. Similar nuts are employed on the outside of the side members.

As clearly shown in Figs. 2 and 4 there are a plurality of U-shaped bars 36 which are adapted to be engaged by projections 37 on the enlarged portions 25 of the key bars. The projections 37 form a code arrangement which will be described later. Between each of the U-shaped bars I employ washers 38 so as to form a desirable amount of clearance between these U-shaped bars so that when they are operated they will not engage one another. Connected to each of these bars is a second U-shaped member 39 which extends upwardly and has pivoted thereto at 40 the ejector mechanism which is used for expelling or thrusting the coins of the different denominations from the coin magazine. This ejector mechanism is in the form of an arm 42 which is loosely mounted on the pivot 40. At the rear is a weighted portion 43, the purpose of which will be later described. The U-shaped bars 36 as shown in Fig. 2 are held by their own weight against stops in the form of two plates 44—44 which extend forwardly slightly more than the projections 37, thus preventing contact with these projections except when the keys 16 are actuated. This arrangement provides that after the U-shaped bars have been actuated in accordance with the code arrangement, the particular bars will fall back against these stops 44, thus preventing any vibratory effect such as would occur if they fell directly against the projections 37. As an auxiliary arrangement to prevent a vibratory effect I employ a bar 45 which is adapted to form the bearing surface of each of the U-shaped bars 39 and in this way it will be seen that there are two stops which coöperate to effect the desired result. In addition to these stops for the U-shaped bar mechanism I employ two stops, one of which is stationary and the other movable, which form the forward limit of movement or throw of these U-shaped bars 36. The stationary stop is shown at 46 and is secured at the bottom to the rod 19 and extends upwardly and is fastened to the rod 47 extending between the frame. This member is held in place by means of two sleeves 48 which are secured to the rod 47 by means of suitable screws. This stop is of the same conformation as the pivoted stop 49, the only difference being that the stop 49 is movable and is used at certain times as a locking arrangement to prevent movement of the U-shaped bars 36. Fig. 4 shows such a condition.

As a means for retaining the member 49 in the locked position an arm 50 pivoted at 51 extends through a slot 52 in the plate 31. This member 50 having notches 53 for positive connection with the plate 31. The member 49 is also slotted at 54 so that when it is in its locking position the bar 45 may enter this lot. The upper part of the member 49 is cut off at 55 so that it may pass underneath the rod 47. This locking member is adapted to pass between two sleeves 56 suitably held upon the rod 47. The coin magazine 57 is in the form of a plurality of channels $57^a$, $57^b$, $57^c$, $57^d$, $57^e$, $57^f$, $57^g$, $57^h$, $57^i$, $57^j$ and $57^k$. The channels $57^a$, $57^b$ and $57^k$ are adapted for the reception of silver dollars and $57^c$ receives fifty cent pieces. Channel $57^d$ receives twenty-five cent pieces, channel $57^e$ receives nickels and channels $57^f$, $57^g$, and $57^h$ receive pennies. Channels $57^i$ and $57^j$ receive dimes.

The ejector mechanism has associated therewith a locking arm 58 which is pivoted at 40 and has a weighted portion 59. The arm 42 extends through a slot 60 and the arm 58 extends through a slot 61 in the plate 31. It is to be understood, of course, for each ejector and locking mechanism, of which there are eleven as shown in Fig. 2, similar slots in the plate 31 are provided, all of which are of the same size. Associated with each of the channels 57 there is a slot 62 into which the ejector and locking mechanisms project as shown clearly in Figs. 3 and 5. The member 58 has a notch 63 which, as shown in Fig. 7, engages with the plate 31 when there are no coins in that channel with which this bar is connected. This forms a locking means so that in case of actuation of the U-shaped bar the edge 64 will engage with the plate 31 so that there will be but very slight movement of both the members 42 and 58 owing to this locking arrangement. This particular view, however, shows that when coins are in the channel there will be no locking effect. The members also serve the purpose, owing to their weighted nature, of counter-balancing one of the coins and lifting it slightly when they are used in connection with those channels in which two coins are expelled at one actuation of the ejector mechanism. Such would be the case in connection with the channels $57^a$ and $57^b$ and $57^g$ and $57^h$ as shown in Fig. 10. This arrangement then provides for locking a particular ejector mechanism when there are no coins in a particular channel and it also provides a locking arrangement where there is but one coin in the channel when at each operation two should be thrust therefrom. So as to provide means for holding the coin directly above those being expelled, ears 65 are employed for that purpose, that is to say, they prevent the expulsion of any coin except those which it is desired to throw into the hopper. Each of the bars 42 has engaging therewith a screw 66 which is screw threaded into the bar 67 and connected to the side members of the machine. A locking member 68 is employed to hold the screw in any desired position. This forms the adjusting means for the member 42 so that the proper number of coins will be engaged and expelled from the magazine. The magazine 57 is arranged to be removable and preferably consists of a plate 65¹ which has at its lower end and extending at right angles thereto a portion 66¹. Secured above this portion 66¹ and in alinement with each of the channels is a piece of metal 67' which forms a pocket for each channel. Brackets 68¹—68¹ extending from the machine are provided with set screws 69—69 which engage the lower portion of the magazine as shown particularly in Figs. 1 and 3 and serve to hold it in place, and also provide for its ready removal in case it is desired. The brackets 68¹ are provided with grooves 70—70 for the reception of the members 71—71 of a hopper 72. Ears 73—73 form means for properly placing the hopper in position upon the brackets. When the coins are expelled from any of the channels they will be thrust into this hopper and owing to its conformation they fall on to a cap 74 which closes the lower opening of the hopper. This cap is pivoted at 75 and has a spring 76 for holding it in its closed position. A finger piece 77 is provided so that the cap 74 may be rotated and the coins which have accumulated withdrawn.

Referring now particularly to Figs. 2, 3 and 11 a brief description will be given of the code arrangement for my machine. Take for example where one wishes to get five silver dollars from this machine. It will be necessary to depress the key 16 marked "$5.00" as shown in Fig. 1, when three projections 37 connected with this key will engage the U-shaped bars A, B and K, thus rotating these U-shaped bars, and consequently the ejector mechanism connected therewith which, in this instance, would be coöperating with channels 57ᵃ, 57ᵇ and 57ᵏ, thereby two silver dollars would be thrust from each of the channels 57ᵃ and 57ᵇ and one dollar from the 57ᵏ channel thus aggregating five dollars which would be expelled into the hopper and which could be removed by inserting the hand against the finger piece 77 so as to rotate the U-shaped cap 74. It may be here stated that the U-shaped bars are capitalized to correspondence with the above channels with which they are associated. The adjustment is such that in connection with the channels 57ᵃ, 57ᵇ, 57ᵍ and 57ʰ there are two coins expelled at one operation of the associated ejector mechanism. Another example illustrating the operation is when the key marked "5" at the upper left hand corner is depressed five pennies will be thrown into the hopper by the projections 37 associated with this key, being brought into engagement with the U-shaped bars F, G and H, thus oscillating the ejector mechanism connected with these bars and thereby expelling two pennies each from the channels 57ᵍ and 57ʰ and one from the channel 57ᶜ. In order to get any further combination of change from this machine all that is necessary is to actuate a certain number and the particular mechanism connected therewith according to the code arrangement which will expel the coins from the channels. At times it may be desirable to actuate all of the U-shaped bars at once and obtain the aggregate amount of change which the machine will give at one actuation which in this instance would be $6.05. This key, it will be seen from Fig. 1 has associated therewith projections 37 which oscillate all of the U-shaped bars at one actuation. This key, for the sake of clearness, may be indicated as the A' key in Fig. 11.

I shall now refer more fully to the mechanism for locking the machine. We will consider that the above channels are supplied with coins and it becomes desirable to lock the machine against actuation, such, for example, as when the attendant leaves for some purpose. All that will then be necessary is to slip the hopper out from the grooves and move the locking member 49 into the position shown in Fig. 4 by means of the arm 50, when oscillation of the U-shaped bars 36 will be prevented and after which the hopper may be replaced. In addition to this mechanism I have employed a hood 78 which is clearly shown in Figs. 8 and 12. This hood is adapted to be placed over the coin magazine and closes the magazine upon the back, sides and front. This hood is provided with a slot 79 which engages a member 80 secured on the hopper 72. A lock 81 is provided in connection with the member 80 so that the machine can be securely locked to prevent tampering therewith. In Figs. 13, 14 and 15 I have illustrated the coin receptacle which may be substituted for the hopper 72 when it becomes desirable to deplete the machine of the money as well as count the money rapidly. This can be done by pressing the key marked $6.05 and during such operation the coins of the different denominations will fall or drop into pockets 82 which register with the different channels in the coin magazine. This receptacle is provided with hinged portions 83—83 which have ears 84—84 that are pushed into the grooves 70—70. It is of course necessary before that has been done to remove the cover which is adapted to be slid into place on the top of the receptacle. When all the money in the machine has been emptied into this receptacle it may be placed in a vault or other place of security.

The mechanism employed is of such nature that the parts will always maintain the adjustment which has been initially made and further, these parts are so constructed that there is a minimum amount of wear thereon.

I claim:

1. In a coin delivering machine, the combination of a pivot rod, a plurality of U-shaped bars hung obliquely above said rod, stops at the rear of said bars, a plurality of pivotally mounted selector key bars hung from said rod, code projections on each of said key bars for engaging with one or more of said U-shaped bars, an ejector mechanism associated with said bars, and a magazine with which said ejector mechanism is associated.

2. In a coin delivering machine, the combination of a pivot rod, a plurality of U-shaped bars hung obliquely above said rod, a plurality of pivotally mounted selector key bars hung upon said rod, code projections on each of said key bars for engaging with one or more of said U-shaped bars, stops in the rear of said U-shaped bars extending forwardly a greater distance than the code projections on said key-bars, stops for limiting the forward movement of said U-shaped bars, said U-shaped bars resting against the rea rstops by their own weight, ejector mechanism associated with said bars, and a magazine with which said ejector mechanism is associated.

3. In a coin delivering machine, the combination of a coin magazine, ejector mechanism associated therewith, a plurality of keys for operating said ejector mechanism, said keys being of different lengths and being so arranged that those involving the greatest amount of coin are the longest, said keys having weighted ends to retain them in their normal position.

4. In a coin delivery machine, the combination of a magazine comprising a channel adapted to receive coins, a pivot member, actuating means adapted to oscillate about said pivot member, said actuating means being held in the normal position by the weight thereof, an ejector pivotally connected to said actuating means and arranged to extend through a slot into said channel to engage the coins, means for adjusting the engaging end of said ejector, and a locking member independent of said ejector but adapted to move therewith, said locking member being held in an unlocked position by the coins in said channel.

5. In a coin delivering machine, the combination of a magazine comprising a channel adapted to receive coins, a pivot member, actuating means adapted to oscillate about said pivot member, said actuating means being positioned upon said pivot member so that the weight thereof serves to hold said means in the normal position, an ejector connected to said actuating means and arranged to extend through a slot in the channel to engage the coins, devices for adjusting the engaging end of said ejector, and a locking member independent of said ejector but adapted to move therewith, said locking member being held in an unlocked position by the contents of said channel.

6. In a coin delivering machine, the combination of a magazine comprising a plurality of channels adapted to receive stacks of coins of different denominations, actuating mechanism, ejectors connected with said mechanism and arranged to extend through slots into said channels to engage the coins, a threaded member stationarily mounted relatively to the movement of each of said ejectors to raise and lower the thrusting ends of the same as desired, and means for limiting the movement of said ejectors.

7. In a coin delivering machine, the combination of a magazine comprising a plurality of channels adapted to receive stacks of coins, a pivot member, actuating devices adapted to oscillate upon said pivot member, ejectors connected with said devices and arranged to extend through slots into the said channels to engage the coins, threaded devices for raising and lowering the thrusting ends of said ejectors, and mechanism for limiting the movement of said ejectors.

8. In a coin delivering machine, the combination of a magazine comprising a plurality of channels adapted to receive stacks of coins of different denominations, a pivot member, actuating devices adapted to oscillate upon said pivot member, said actuating devices having enlarged rear portions and positioned upon said pivot member so that they will by their own weight be restored to normal position after actuation, ejectors connected with said devices and arranged to extend through slots into the channels to engage the coins, locking devices independent of said ejectors and adapted to be held out of locking engagement by the coins in said channel, and mechanism for limiting the movement of said ejectors and locking devices.

9. In a coin delivering machine, the combination of a casing, a magazine supported obliquely outside of said casing and comprising a plurality of channels adapted to receive coins of different denominations, a pivot member, actuating devices pivoted on said member, locking means for said actuating devices, ejectors connected to said actuating devices for thrusting coins from said channels, a hopper supported by said casing, a hood adapted to be placed over said magazine and locking means between said hood and said hopper.

10. In a coin delivering machine, the combination of a casing, a hopper supported by said casing, a coin magazine supported outside of said casing comprising a plurality of channels for reception of assorted coins, means for expelling certain coins from said channels into said hopper, locking mechanism for the said means, a hood adapted to cover said magazine, and locking means between said hood and said hopper.

11. In a coin delivering machine, the combination of a pivot rod, key bars supported therefrom and having enlarged rear portions to retain said key bars in their normal position, said enlarged portions also having projections forming a code, U-shaped bars adapted to oscillate upon said pivot rod and adapted for engagement by said projections, stops at the rear of said U-shaped bars, stops to limit the forward movement of said U-shaped bars, a coin magazine comprising a plurality of channels, and ejectors connected with said U-shaped bars and adapted to engage coins in said channels.

12. In a coin delivering machine, the combination of a pivot rod, key bars supported therefrom and having enlarged rear portions to retain said key bars in their normal position, said enlarged portions also having projections forming a code, U-shaped bars adapted to oscillate upon said pivot rod and adapted for engagement by said projections, stops at the rear of said U-shaped bars, stops to limit the forward movement of said U-shaped bars, a coin magazine comprising a plurality of channels, ejectors connected with said U-shaped bars and adapted to engage coins in said channels, and a locking device for each ejector for preventing the action of said ejector when the contents of the corresponding channel are removed.

13. In a coin delivering machine, the combination of a pivot rod, key bars supported therefrom and having enlarged rear portions to retain said key bars in their normal position, projections upon said portions forming a code, U-shaped bars adapted to oscillate upon said pivot and adapted to be engaged by said projections, stops at the rear of said U-shaped bars, stops to limit the forward movement of said U-shaped bars, said U-shaped bars being normally held against the rear stops by their own weight, one of said forward stops being rotatable to form a lock for said U-shaped bars when desired, a coin magazine comprising a plurality of channels, ejectors connected with said U-shaped bars and arranged to extend through slots into said channels to engage the coins, devices for raising and lowering the thrusting end of said ejectors, and locking devices independent of said ejectors but adapted to move therewith, said locking devices being held in an unlocked position by the proper number of coins in said channels.

14. In a coin delivering machine, the combination of a pivot rod, key bars supported therefrom and having enlarged rear portions to retain said key bars in their normal position, said enlarged portions having projections forming a code, U-shaped bars adapted to oscillate upon said pivot rod and adapted for engagement by said projections, stops at the rear of said U-shaped bars to normally prevent engagement of said U-shaped bars with the projections, stops at the front of said U-shaped bars, one of said stops being rotatable so as to lock said U-shaped bars when desired, a coin magazine comprising a plurality of channels, and ejectors connected with said U-shaped bars and adapted to engage coins in said channels.

15. In a coin delivering machine, the combination of a pivot rod, key bars supported therefrom and having enlarged rear portions to retain said key bars in their normal position, means for maintaining said enlarged portions in a substantially vertical position, said enlarged portions having projections forming a code, U-shaped bars adapted to oscillate upon said pivot rod and adapted for engagement by said projections, a pair of abutment members at the rear of said U-shaped bars to prevent said U-shaped bars from normally engaging said projections, stops to limit the forward movement of said U-shaped bars, one of said stops being rotatable and being adapted to lock said bars when desired to prevent their actuation, a coin magazine comprising a plurality of channels, and ejectors connected with said U-shaped bars and adapted to engage coins in said channels.

16. In a coin delivering machine, the combination of a pivot rod, key bars supported therefrom and having enlarged rear portions to retain said key bars in their normal position, projections upon said portions forming a code, U-shaped bars adapted to oscillate upon said pivot rod and adapted to be engaged by said projections, stops at the rear of said U-shaped bars, stops to limit the forward movement of said U-shaped bars, said U-shaped bars being normally held against the rear stops by their own weight, one of said forward stops being rotatable to form a lock for said U-shaped bars when desired, a link pivoted to said rotatable forward stop so that it may be rotated to any position desired, a coin magazine comprising a plurality of channels, ejectors connected with said U-shaped bars and arranged to extend through slots into said channels to engage the coins, devices for raising and lowering the thrusting ends of said ejectors, and locking devices independent of said ejectors but adapted to move therewith, said locking devices being held in an unlocked position by the proper number of coins in said channel.

17. In a coin delivering machine, the combination of a magazine comprising a plurality of channels adapted to receive stacks of coins of different denominations, a pivot member, actuating devices adapted to oscillate upon said pivot member, said actuating devices having enlarged rear portions and positioned upon said pivot rod so that they will by their own weight be restored to their normal position after actuation, alining means for said enlarged rear portions, ejectors connected with said devices and arranged to extend through slots into the channels to engage the coins, locking devices independent of said ejectors adapted to be held out of locking engagement by the coins in said channel, and mechanism for limiting the movement of said ejectors and locking devices.

In witness whereof, I hereunto subscribe my name this 18th day of March, A. D. 1912.

BENJAMIN C. HOEFER.

Witnesses:
ARTHUR H. BOETTCHER,
LEONARD E. BOGUE.